United States Patent
Young

(10) Patent No.: US 9,010,378 B2
(45) Date of Patent: Apr. 21, 2015

(54) FLUID LINER FABRICATION AND INSTALLATION

(76) Inventor: James F. Young, Kennewick, WA (US)

(*) Notice: Subject to any disclaimer, the term of this patent is extended or adjusted under 35 U.S.C. 154(b) by 1190 days.

(21) Appl. No.: 12/761,341

(22) Filed: Apr. 15, 2010

(65) Prior Publication Data

US 2010/0263748 A1    Oct. 21, 2010

Related U.S. Application Data

(60) Provisional application No. 61/170,039, filed on Apr. 16, 2009.

(51) Int. Cl.
| | |
|---|---|
| *F16K 15/14* | (2006.01) |
| *B32B 3/06* | (2006.01) |
| *B29C 53/04* | (2006.01) |
| *B29C 65/10* | (2006.01) |
| *B29C 65/50* | (2006.01) |
| *B29C 65/52* | (2006.01) |
| *B29C 65/00* | (2006.01) |
| *E02B 3/12* | (2006.01) |
| *E02D 17/20* | (2006.01) |
| *B29C 53/84* | (2006.01) |
| *B29C 65/82* | (2006.01) |
| *B29K 21/00* | (2006.01) |
| *B29K 101/12* | (2006.01) |

(52) U.S. Cl.
CPC .............. *B32B 3/06* (2013.01); *Y10T 156/10* (2015.01); *B29C 53/04* (2013.01); *B29C 53/84* (2013.01); *B29C 65/10* (2013.01); *B29C 65/5057* (2013.01); *B29C 65/526* (2013.01); *B29C 65/8207* (2013.01); *B29C 65/8246* (2013.01); *B29C 65/8253* (2013.01); *B29C 66/1122* (2013.01); *B29C 66/232* (2013.01); *B29C 66/43* (2013.01); *B29C 66/8362* (2013.01); *B29C 66/919* (2013.01); *B29C 66/939* (2013.01); *B29K 2021/00* (2013.01); *B29K 2101/12* (2013.01); *B29K 2995/0069* (2013.01); *E02B 3/122* (2013.01); *E02D 17/202* (2013.01); *B29C 65/103* (2013.01); *B29C 66/91421* (2013.01); *B29C 66/934* (2013.01); *B29C 66/434* (2013.01)

(58) Field of Classification Search
CPC ....... E02D 31/004; E02D 31/006; B32B 3/06; E02B 3/122; Y10T 156/10
USPC ........ 137/844; 156/159; 405/107, 114, 129.6, 405/129.75
See application file for complete search history.

(56) References Cited

U.S. PATENT DOCUMENTS

| | | | | |
|---|---|---|---|---|
| 4,800,119 | A * | 1/1989 | Kolar | 442/373 |
| 5,507,900 | A * | 4/1996 | Mohammed et al. | 156/157 |
| 5,544,976 | A * | 8/1996 | Marchbanks | 405/129.6 |
| 5,961,093 | A * | 10/1999 | Jones et al. | 248/678 |
| 6,524,677 | B1 * | 2/2003 | Bechtold | 428/57 |
| 2008/0227914 | A1 * | 9/2008 | Peng | 525/65 |

* cited by examiner

*Primary Examiner* — Kevin Lee
*Assistant Examiner* — P. Macade Nichols
(74) *Attorney, Agent, or Firm* — Paul W. Mitchell; Remembrance Newcombe; Rainier Patents, P.S.

(57) ABSTRACT

The present application relates to fluid liners. One example includes first and second recycled geosynthetic sheets having overlapping portions. A heat welded splice is formed along the overlapping portions creates a fluid seal between the first and second recycled geosynthetic sheets so that the first and second geosynthetic sheets collectively function as a fluid liner.

2 Claims, 8 Drawing Sheets

US 9,010,378 B2

FLUID LINER FABRICATION AND INSTALLATION

PRIORITY

This patent application claims priority from U.S. Provisional Application No. 61/170,039, filed on Apr. 16, 2009, which is incorporated by reference in its entirety.

BACKGROUND

The use of geomembranes in lining and covering fluid containment structures, e.g., irrigation canals, can mitigate water loss due to seepage and evaporation. However, current membranes are associated with several disadvantages regarding their durability, installation, and cost.

With respect to durability, current geomembranes can be covered with concrete or other similar material when installed as fluid liners. This can increase the durability of these membranes over the long term, e.g., over 5-10 years more, as compared to geomembranes that are left uncovered and thus exposed. This is because exposed geomembranes are susceptible to damage from external forces such as animal traffic, construction equipment, vandalism, and the like. In addition, typical materials used for geomembranes differ in their ability to lay flat and remain flat as temperatures change, in their ability to conform to rough sub-grades and adjust to soil settlement without leaking, in their resistance to UV weathering and oxidation, in their ability to be properly and easily installed while maintaining watertight integrity, and in their ability to be repaired effectively with reasonable cost and effort.

With respect to installation, surveys suggest that approximately 25% of membrane leaks result from the process of installing these geomembranes in waterways or other fluid containment structures. Installation methods have been developed for these geomembranes in an attempt to achieve strong watertight splices. However, some methods require expensive tools while others use chemical (adhesive) bonding systems that may be sensitive to weather, temperature, humidity, and/or rain. Regardless of the splicing method used, field splicing can become the determining factor for the speed by which a lining can be installed and ultimately the success of the installation. Further, repairs during the life of the liner are often neglected or performed poorly because of the lack of equipment and/or experience of the person assigned to make the repairs. Furthermore, once current geomembranes reach the end of their lifecycle, they need to be disposed of, thus adding to the environmental concerns associated with disposing of this type of waste.

With respect to cost, current geomembrane materials used for fluid liners typically include: high density polyethylene (HDPE), linear low density polyethylene (LLDPE), polyvinylchloride (PVC), flexible polypropylene (fPP), chlorosulphonated polyethylene (CSPE), ethylene-propylene diene monomer (EPDM), bituminous geomembrane (BGM), polyurea (PU), and/or Hypalon®. These materials are petroleum-derived products. As such, the cost of these materials closely correlates and depends on petroleum prices, which have been and will likely continue to be volatile. For example, oil prices spiked beyond $150/barrel during 2008. As such, the cost of current geomembrane materials is relatively unpredictable and likely to be relatively expensive.

BRIEF SUMMARY

Techniques are described for providing an apparatus or fluid liner, e.g., an irrigation canal liner, pond liner, etc., consisting of one or more geosynthetic sheets, such as one or more geomembrane sheets made of a rubber component such as recycled ground rubber blended or interspersed with a recycled and/or virgin thermoplastic component for example. Hereinafter geomembrane sheets that have a recycled component are referred to as "recycled sheets". The fluid liner can be used as a lining and/or covering to contain fluid. In some implementations, the fluid liner is employed to line irrigation canals, such as over a soil substrate or a poorly performing man-made substrate, such as a degraded concrete substrate. Splicing techniques are described for fabricating fluid liner sections or apparatuses from these recycled sheets. In addition, splicing techniques are described for installing these sections (and/or individual recycled sheets) into a fluid containment structure such as an irrigation canal, pond, or the like to prevent fluid loss.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Figure 1:
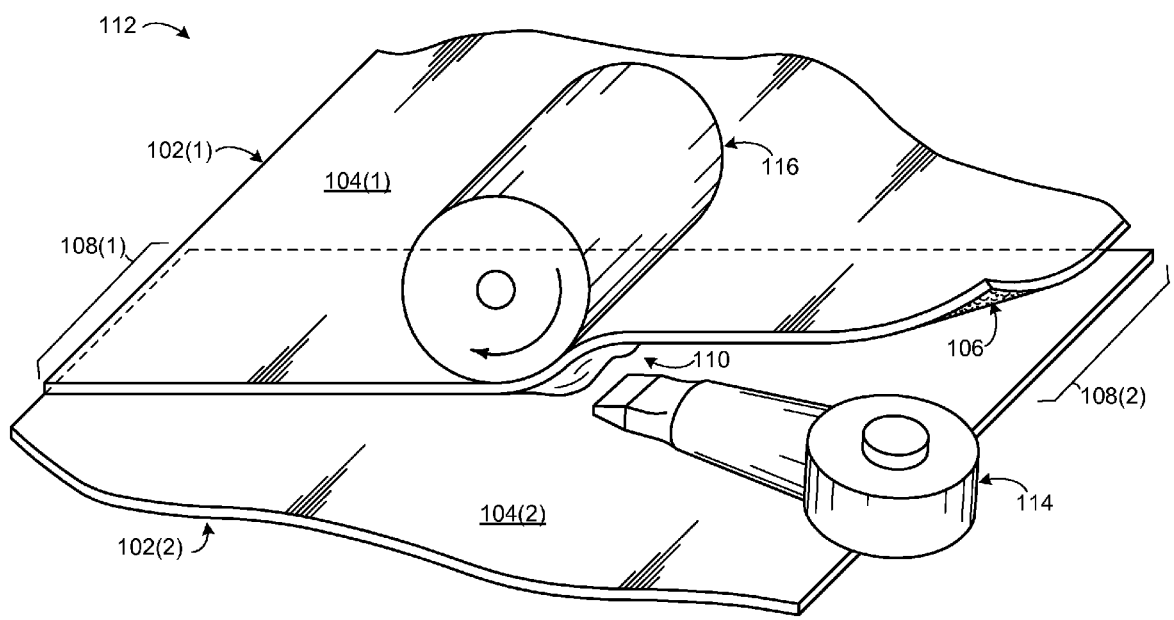
FIGS. 1-4 and 8 show perspective views of fluid liners in accordance with some implementations of the present concepts.

Techniques are described for providing a fluid liner, e.g., an irrigation canal liner, pond liner, etc., from one or more recycled sheets. The fluid liner can be used as a lining and/or covering to contain fluid. Splicing techniques are described for fabricating fluid liner sections or apparatus from these recycled sheets. In addition, splicing techniques are described for installing recycled sheets and/or the fluid liner sections into a fluid containment structure such as an irrigation canal, pond, or the like to prevent fluid loss. In summary, some implementations can utilize a two-stage process to create the fluid liner. First, multiple recycled sheets can be spliced or otherwise fixed together to form a fluid liner section. Second, fluid liner sections can be spliced together to form the fluid liner. Other implementations may utilize a single process where recycled sheets are spliced together to form the fluid liner.

In some embodiments, a geomembrane material utilized to construct the recycled sheets can be in the form of from about 40% to 60% recycled rubber, e.g., crumb rubber, and recycled and/or virgin (non-recycled) thermoplastics. The recycled rubber can be obtained from any suitable source or sources, such as from used tires and/or other rubber products for example. The recycled rubber component offers a lower and more stable cost over current geomembranes by virtue of utilizing recycled rubber rather than materials derived directly from petroleum. These cost advantages can allow for thicker and heavier recycled sheets to be provided at reasonable and competitive costs. The durability of thicker and heavier recycled sheets, in turn, can enhance lifetime effectiveness. For instance, these thicker recycled sheets can provide longer-term aging, cushioning against inherent puncture damage, reduction and/or elimination of ballast, ease and speed of installation, on-site splicing tolerant of weather conditions, and/or upkeep and repair without requiring special tools, and by persons with little or no special training.

The present implementations can take advantage of the cost and environmental advantages by leveraging properties of the recycled sheets to achieve fluid liner installation configurations that have previously been unattainable. For instance, the present techniques can leverage thermosetting properties of the recycled rubber component which tends not to be remoldable and is less sensitive to temperature extremes than thermoplastic to provide a durable fluid liner. Further, thermoplastics components can allow for fabrication and/or installation of individual recycled sheets or fluid liner sections using splicing techniques, such as thermal welding techniques.

To assist the reader in understanding and appreciating the described techniques, the following non-limiting example embodiments are described.

Example Recycled Sheet Specification

In one or more embodiments, a suitable material including a recycled rubber and thermoplastic formulation is utilized for the recycled sheet, according to the example specification provided below. One example of a commercially suitable recycled crumb rubber and thermoplastic geomembrane formulation is a product designated "CLG-3231" which is available from Envirotech Extrusion, Inc. of Richmond, Ind.

In this example recycled sheet specification, a recycled sheet of at least about 0.1 inches thick, and with a hardness range of about 75-86 durometer (shore A) and a specific gravity greater than 1 is utilized to provide the fluid liner. These recycled sheets are presently available in widths up to 8 feet wide. The actual thickness and/or hardness to be used can be determined based on the perceived conditions in which the fluid liner is to be used. In the context of a fluid liner for a water canal, the canal's design, soil conditions, expected water velocity (thus potentially influencing uplift in the invert without the aid of ballast), and physical terrain can be taken into account. For example, a thicker recycled sheet, and thus thicker geomembrane, might be utilized for a liner associated with an expected relatively fast water flow in order to mitigate liner uplift in the invert without the aid of ballast, and to provide puncture resistance from rocky sub-grade conditions.

Here it can be noted that a recycled sheet in accordance with this example specification, when used in the Pacific Northwest region of the United States, can be associated with a life expectancy of at least about 10-20 years.

In at least some embodiments, the surface of the recycled sheet exposed to fluid flow (up) can be designed to be smooth except for designed stiffeners (cleats) (described later in this document) and splices. The recycled sheet surface exposed to the soil or other underlying surface (down) can be embossed with a texture such as a random, geometric, ribbed, grooved, or other type of pattern. By embossing the down surface of the recycled sheet in such a manner, the texture can engage the soil or other underlying surface to reduce sheet movement (e.g., sliding) along a slope and/or movement caused by expansion and contraction.

One such example can be seen in FIG. 1 that shows first and second recycled sheets 102(1), 102(2). Generally, FIG. 1 shows a top surface 104(1), 104(2) of sheets 102(1), 102(2), respectively. A portion of recycled sheet 102(1) is turned up to show a bottom surface 106. In this case, upper surfaces 104(1) and 104(2) are generally smooth to decrease friction with the moving water. In contrast, bottom surface 106 is textured to increase friction with the underlying substrate. In summary, some implementations can employ a friction increasing configuration on the bottom surface of the recycled sheets to engage the underlying substrate and a friction reducing configuration on the top surface to reduce drag by the water passing over the recycled sheets.

Recycled Section Fabrication

Figure 2:
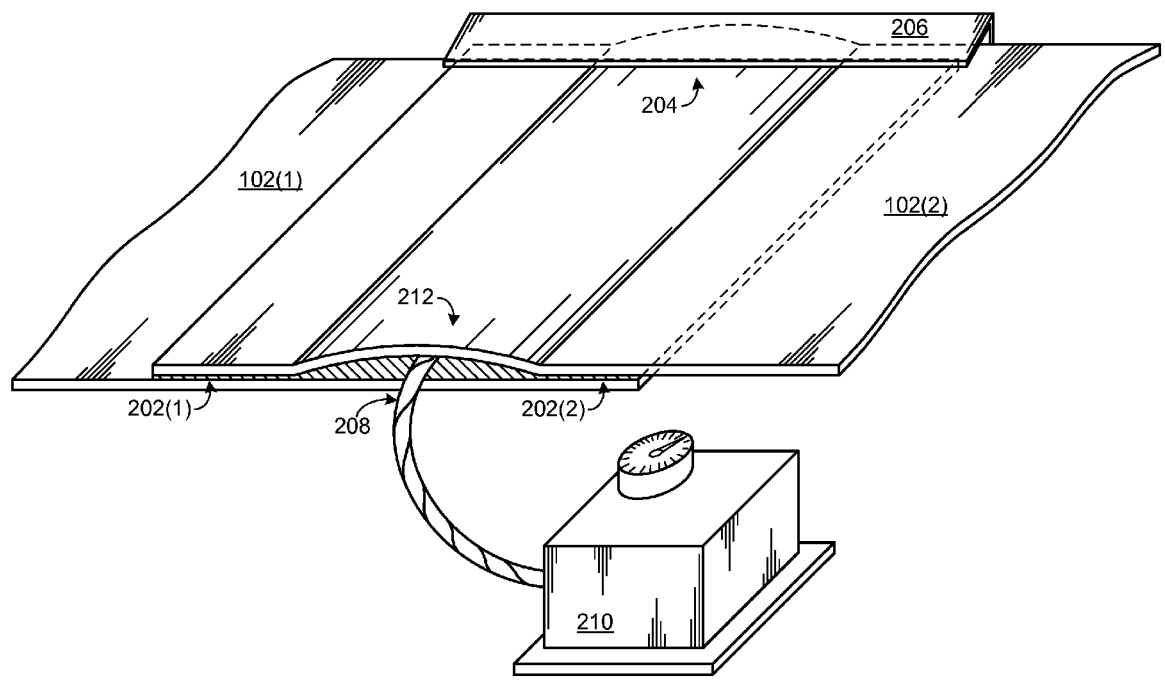

In one or more embodiments, a thermal splicing process can be utilized to thermally weld recycled sheets together to fabricate fluid liner panels or sections 110. More particularly, as illustrated in FIG. 1, recycled sheets 102(1) and 102(2) can be positioned so that a portion 108(1) of the first recycled sheet overlaps a portion 108(2) of the second recycled sheet. A region(s) 110 or regions of the overlapping portions can then be heat welded to create an impermeable seal, and thus a fluid liner section 112. (In this example, a single region 110 is utilized to form the splice. FIG. 2 provides an example where multiple regions are employed to form a splice.) In at least some embodiments, multiple fluid liner sections 112 can be installed in an irrigation canal, pond, or other containment structure to prevent or minimize loss of fluid due to seepage and/or evaporation.

As introduced above, some implementations can splice individual recycled sheets 102(1) and 102(2) utilizing thermal welding. For instance, recycled sheets can be thermally welded together using hot air welding tools and techniques such that they are joined by strong, impermeable splices to form sections or panels. More particularly, hot air welding tools can be used to melt the thermoplastic binder polymer of the formulated material such that the above-described splices are formed to form fluid liner sections, such as fluid liner section 112. The fluid liner sections can be any suitable size and shape, e.g., about 23-30 feet in length and about 14-21 feet wide in one example, depending on their particular use.

In at least some embodiments, a thermal welding tool 114 can be utilized to melt the region 110 of the recycled sheets 102(1) and 102(2). The melted region can be forced together, such as by roller 116 before cooling to facilitate the splicing. In one case welding tool 114 can be manifested as a Leister Process Technologies, Switzerland, "Triac Drive PID" plastic hot air welding tool. The Leister tool blows hot air though a nozzle into a nip or bite between recycled sheets to be joined. The Leister tool pinches the recycled sheets while the surfaces of both sheets are molten, thus forming a weld as material immediately cools. In one example, the temperature control of this thermal welding tool can be set to between 900 and 1000 degrees Fahrenheit. In this example, weld speed can be set between about 2 to 3 feet per minute. The weld can be made in a continuous operation.

The weld width can be of any suitable width based on a desired welding speed and nozzle width. For example, in one or more embodiments a weld width from about ½ to 1 inch wide can be made. The weld can terminate along the recycled sheet edge allowing no loose flap. In some implementations welds can be visually inspected and hand pulled at the terminal ends to assure integrity. In most installations, a single weld will have sufficient strength and integrity. When a double welded seam is specified or when all seams require leak testing, the fluid liner section 112 can then be turned over. A similar thermal welding procedure can then be repeated to complete a double weld of the splices. The double-welded splices can be of any suitable width, such as about 4 inches wide for example, with two welds approximately ½ inch to 1 inch wide each (or any other suitable width) along each outer edge of the splice, thus leaving an opening of about 2 inches or more between the welds.

FIG. 2 shows a technique for testing a double welded splice between recycled sheets 102(1) and 102(2). In this case, first and second thermal welds are designated at 202(1) and 202(2). A first end 204 of the double welded splice can be clamped as indicated at 206. A nozzle 208 from a pressurized fluid source 210 can be positioned in opposing second end 212 of the thermal welds. The second end 212 can be clamped (not shown) around the nozzle 208. The resulting volume defined between first and second thermal welds 202(1) and 202(2) and clamped first and second ends 204 and 212 can be pressurized and pressure loss can be monitored as an indicator of leakage.

In summary, in some implementations, multiple recycled sheets can be spliced together utilizing thermal bonding to provide a very strong joint between the individual recycled sheets. In some implementations, this fluid liner section formation can be performed in a controlled environment, such as a machine shop, to reduce the number of splices made in the field during the installation.

Example Adhesive Splicing Technique

In one or more embodiments, splicing techniques (i.e., forming a seam between two recycled sheets) associated with an adhesive/mastic bonding procedure can be used for splicing individual recycled sheets, for splicing fluid liner sections together during installation, for sealing cuts in recycled sheets for gusset attachment, and/or for patching and repair operations. These adhesive splicing and repair techniques can be performed in the field during installation or at any other time and/or place in order to provide fluid-tight integrity with respect to recycled sheet/sections. Furthermore, these adhesive splicing/bonding techniques can be accomplished quickly and securely in virtually any type of climate and conditions, without requiring that the person(s) performing these operations receive significant training or have specialized skills. As such, heat welding which may cause tearing of recycled sheet/section during normal expansion, and which typically is performed by a highly skilled and trained person, is not necessary.

In at least some embodiments, the following materials are used with respect to the adhesive splicing/bonding techniques described herein: a solvent used to remove dirt and oils that may have migrated from rubber, a rubber cement or adhesive, and an uncured rubber—which in one or more embodiments may have a poly film to keep it from sticking together when rolled up. For example, a solvent commercially available as "Cleaner Fluid" from Patch Rubber Company of Roanoke Rapids, N.C. can be used, a rubber cement or adhesive commercially available as "Fiber Bond Cement" (brush grade) from Patch Rubber Company of Roanoke Rapids, N.C. can be used, and an uncured rubber product commercially available as "Tie Gum Grade I/II" from Patch Rubber Company of Roanoke Rapids, N.C. can be used.

Figure 3:
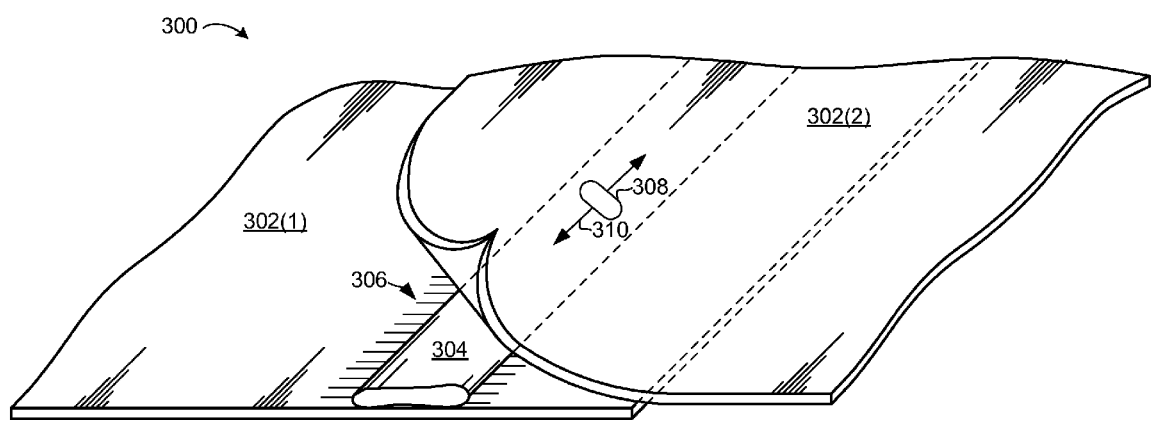

FIG. 3 shows one adhesive bonding technique to form a fluid liner section 300 from first and second recycled sheets 302(1) and 302(2). In some cases, when recycled sheets 302(1) and 302(2) are prepared for bonding or gluing together, the recycled sheets are positioned first without an adhesive and then secured in some fashion behind the bond area so that the top sheet can be lifted or folded back. The recycled sheets are then cleaned and adhesive applied to one or both surfaces. The secured recycled sheets can then be brought together with the adhesive. Using techniques described herein however, an uncured rubber strip (e.g., a tie gum strip 304) can be placed onto applied rubber adhesive before bringing two recycled sheets together, in accordance with some implementations.

For example, recycled sheets 302(1) and 302(2) can be positioned where the splice is to be made and both portions can be secured behind the spliced area. The top recycled sheet 302(2) can then be folded back and a rag, sponge, or the like saturated with the cleaner fluid (protective gloves should be worn) can be used to wipe surfaces of the two recycled sheets in the area where adhesive, such as rubber cement, will be applied. In the illustrated configuration, rubber cement 306 is evident on recycled sheet 302(1), but not expressly shown on recycled sheet 302(2). The recycled sheets 302(1) and 302(2) can then be allowed to dry (typically after a few minutes).

With an approximately 3 inch wide brush, rubber cement can be applied the width of the brush to both cleaned surfaces where the splice is to be made, ensuring that the top application area aligns with the bottom. The rubber cement 306 can then be allowed to partially dry (until tacky and not completely dry). The partial drying time of the rubber cement will likely vary based at least in part on the humidity. The tie gum strip 304 can then be applied at a suitable width and thickness, such as about 2 inches wide and about $\frac{1}{32}$ of an inch thick for example, to the center of the rubber cement coated area on the bottom recycled sheet 302(1). As such, the tie gum strip 304 can be centered in the strip of rubber cement applied by the approximately 3 inch wide brush. The top recycled sheet 302(2) can then be folded into the tie gum strip 304 applied to the bottom recycled sheet. The two recycled sheets 302(1) and 302(2) can be placed in contact with one another at the center portion of the splice as indicated at 308, and then contact can be made gradually towards the ends or outer portions of the splice as indicated at 310 to produce a smooth, wrinkle free splice. Using a hand held steel roller (not shown), the splice can be rolled from the center of the splice i.e., middle of the recycled sheets towards the end splice (outer portion of the recycled sheets) to assure good engagement of rubber cement and tie gum and to remove any trapped air in the splice.

In summary, in some configurations the splice can be thought of as a sandwich configuration in that a first adhesive layer adheres to the top recycled sheet and a first surface of the tie gum strip. A second adhesive layer adheres to an opposite side of the tie gum strip and the bottom recycled sheet.

In the context of fabricating recycled sheets to be fit together to form a fluid liner, an adhesive splice technique, such as described above, can be used to join recycled sheets. As such, movement of the recycled sheets, when installed as a fluid liner, from expansion and contraction can be withstood without failure, e.g., leakage and/or destruction, of the anchor points at the joined portions of the recycled sheets. Traditionally, this has been a problem with fluid liners. For example, narrow irrigation canals of about 14 to 21 feet in top width tend to have frequent and/or tight turns. As such, relatively short recycled sheets can easily be aligned to follow the frequent and/or tight canal turns. By virtue of the techniques described herein, movement of the recycled sheet and/or fluid sections can thus be withstood. Stated another way, the above described sandwich configuration splicing techniques can create expansion zones in the finished fluid liner that reduces and/or eliminates failure, such as tearing caused by expansion and contraction in real world installations.

In summary, fluid liner installations can be accomplished by splicing recycled sheets utilizing heat welding and/or adhesive splicing techniques. Some implementations employ both splicing techniques. For instance, several recycled sheets can be spliced together into fluid sections utilizing heat welding techniques. Heat welding techniques can offer very strong splices that match or exceed the strength of the surrounding recycled sheets. The fluid sections can be spliced utilizing adhesive splicing, such as the above mentioned sandwich splice. The adhesive splices can function as expansion joints between adjacent fluid sections to avoid tearing of the recycled sheets and/or splices during temperature extremes experienced during real world installations.

Example Application of Cleats

In one or more embodiments, stiffening ribs or cleats can be applied to recycled sheets and/or sections of a fluid liner to help ensure that the recycled sheets do not lift in a canal cross section area where the bottom horizontal portion transitions to a sloped side. Such cleats can be made of a recycled rubber formulation that is the same as, or compatible with, the formulation of the recycled sheets, e.g., CLG-3231. Individual cleats can be any suitable size and shape. In some embodiments, individual cleats are from about ¼ inch to ½ inch thick, from about 2 inches to 3 inches wide, and from about 3 feet to 4 feet long. The cleats can be thermally welded, using a suitable welding tool, e.g., the Leister Triac hot air welder mentioned above, to the recycled sheets according to the dimensions of the fluid containment structure in which the recycled sheets are to be installed. In some implementations, cleats can be placed laterally, longitudinally, or obliquely across the canal bottom. Another configuration is described below relative to FIG. 4.

Figure 4:
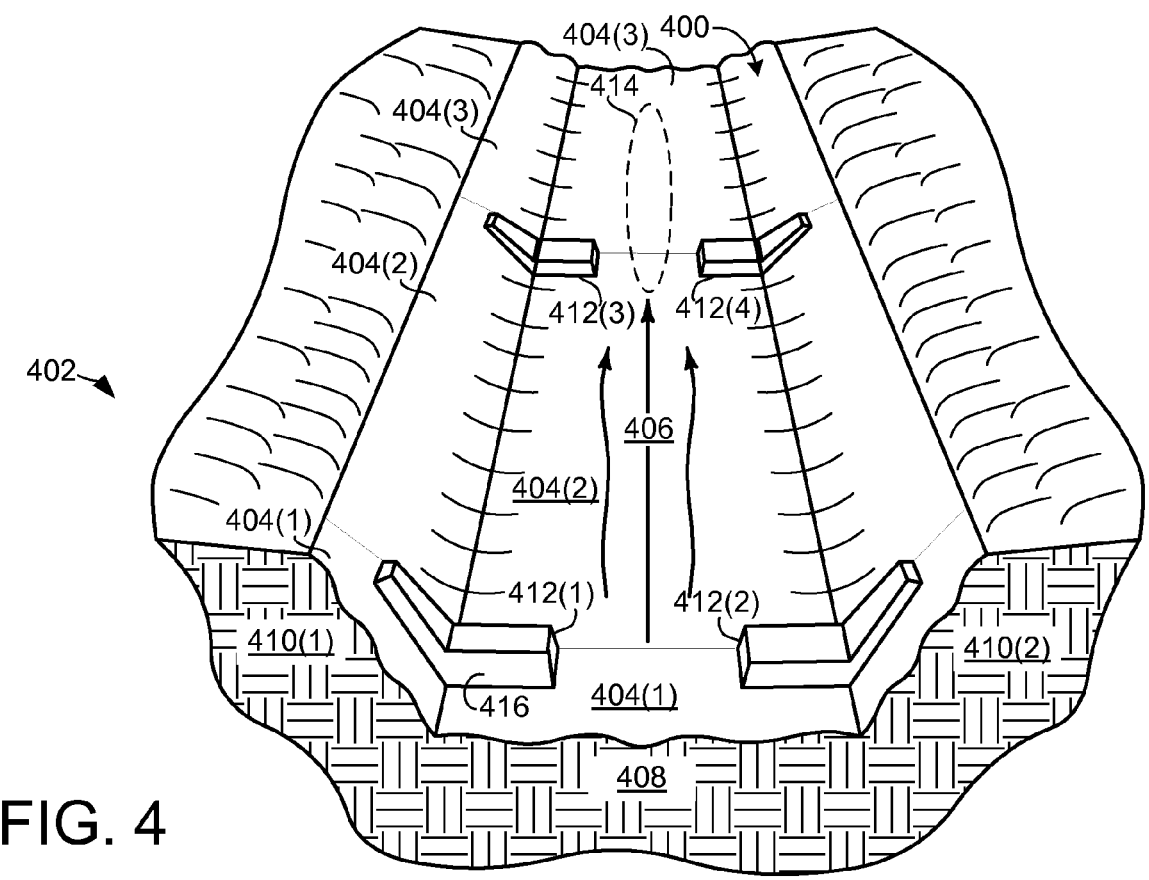

FIG. 4 shows a fluid liner 400 installed in a canal 402. In this case, the fluid liner includes three recycled sheets 404(1), 404(2), and 404(3). Fluid (e.g., water) flow in canal 402 is indicated by arrows 406. When viewed transverse the fluid flow 406, the canal 402 has a generally flat or horizontal bottom portion 408 and opposing first and second side portions 410(1) and 410(2) that extend upwardly from the bottom 408. In this implementation, fluid liner 400 further includes pairs of cleats 412(1) and 412(2) and 412(3) and 412(4) that can be attached in transverse pairs across the fluid liner. In one implementation, individual cleats can be positioned on the fluid liner 400 through a transition area from bottom portion 408 to an individual side portion 410(1) or 410(2). Such a configuration can leave a center 414 of bottom portion 408 free of any cleat obstruction. In some implementations, as represented by cleats 412(1), an upstream edge 416 of individual cleats can be beveled at any suitable angle, such as approximately a 45 degree angle, for example, relative to the fluid liner when measured relative to fluid flow to decrease turbulence and/or hydraulic forces against the fluid liner 400. Individual transverse pairs of cleats 412(1) and 412(2) and 412(3) and 412(4) can be approximately spaced at any suitable distance apart, e.g., 10 feet, according to the dimensions of the fluid containment structure (e.g. canal) where recycled sheets are to be installed to form the fluid liner.

In some instances, the cleat pairs, such as 412(1) and 412(2) can be positioned over the splices joining recycled sheets, such as 404(1) and 404(2). The presence of a cleat pair (i.e., on the top recycled sheet over an adhesive/mastic seal between recycled sheets, such as shown in FIG. 3) placed above and/or proximate to the adhesive/mastic seal between recycled sheets can cause slight downward pressure to provide additional assurance that the seal between individual recycled sheets remains impermeable (e.g., watertight). If uplift becomes a problem after installation, an anchor, such as rebar, can be inserted through the cleat and into the soil below. This anchoring method is faster and less expensive when compared to rock ballast and tends not to damage or puncture the membrane as rock ballast can.

Recycled Sheet/Section Installation

It is anticipated that water conservation engineers or technicians may prepare site preparation specifications and select final recycled sheet specifications, thickness, panel size, cleat configuration, and storage and handling instructions for a planned fluid liner. For example, in the context of a water canal, by using drawings and specifications for the canal that is to receive the fluid liner, recycled sheets can be rolled out and cut to size and spliced to form sections from 25 to 50 feet in length. The following procedure may be used when the overall liner width across the canal is such that only one longitudinal splice is required, approximately not greater than 16 feet in some implementations. Each section can be numbered and water flow direction clearly shown (cleat configuration and splice overlap showing the flow direction can be helpful). Where a longitudinal weld (e.g., generally parallel to water flow) is utilized to make a panel wider than available sizes, the recycled sheet can be overlapped by any suitable amount, such as about 4 inches for example. If a recycled sheet is to be installed in a canal portion where the canal is turning, the recycled sheet overlap can be such that the sweep of the water flow will be from the high to the low side of the splice. In other words, the recycled sheet on the outside of the turn can be on the top side of the splice.

The following procedure may be used when the overall canal width is greater than the width of available recycled sheets, such as 16 feet, and would otherwise require more than one longitudinal welded splice. The recycled sheet/section can be installed in the canal in the transverse direction, across the canal. It should be noted that maximum sheet width available at this time is 8 feet. The recycled sheet can be cut from rolls to the specified length, which is now the canal width (i.e., width of bottom plus depth of each side), and placed across the canal. In some implementations each sheet edge is heat welded to the next using the thermal welding tool described above. A portable 110 V generator can be mounted on a pull cart and moved along the canal bed to supply power to one or more thermal welders.

Further, while not expressly shown, in some embodiments, a portion, such as approximately 1 foot of the recycled sheet/section can be embedded into the berm on each side of the canal 402. Embedding the sheet/section into the berm can be accomplished by cutting a horizontal shelf in the berm above the water line plus safety margin depth. The sheet/section can then be placed on this shelf and secured with soil staples approximately every 3 to 4 feet along the berm. In some configurations, the staples can be inserted only half way into the soil. The soil is then replaced over the sheets/section and the protruding soil staples serve to stabilize the berm soil until vegetation can begin to grow.

In one or more embodiments, techniques can be utilized to install recycled sheet/section into a fluid canal (e.g., water canal), such that panel separation, e.g. sheet uplift from the invert, caused by the forces of water flow in the canal and/or surface water that has migrated under the lining can be mitigated or avoided.

Figure 5:
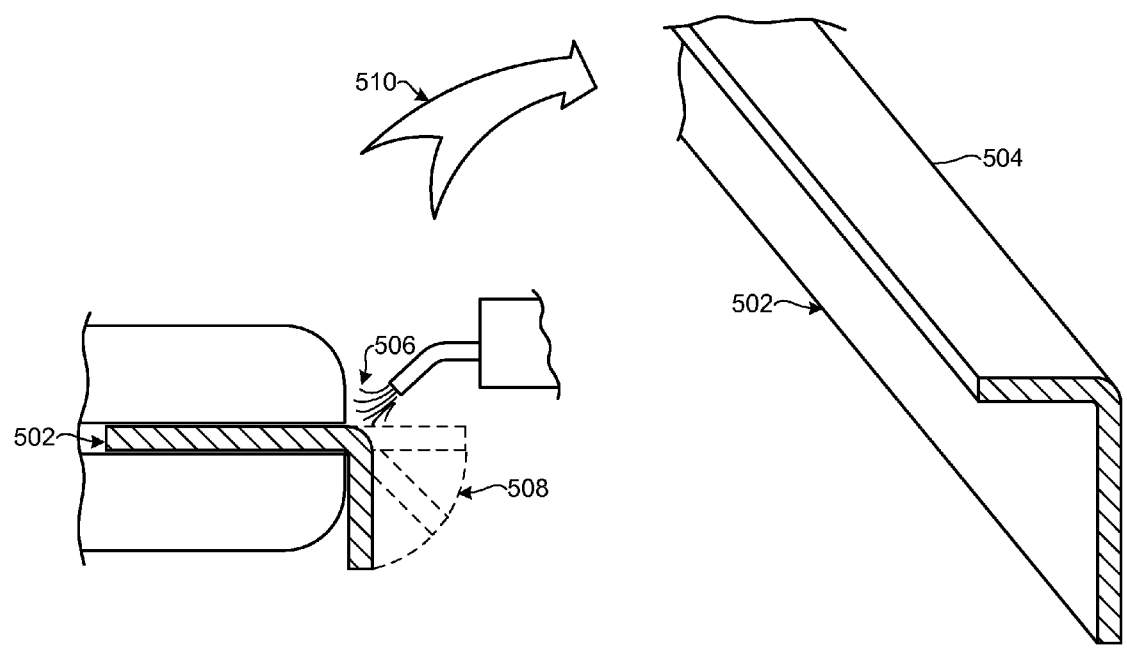
FIGS. 5-7 show fluid liner component forming techniques and components in accordance with some implementations of the present concepts.

FIG. 5 shows one example of a structure for decreasing water uplift of a recycled sheet 502. In this case, the structure is termed a cut-off 504. The cut-off can be formed at one end of the recycled sheet by heating 506 across a region of the recycled sheet and bending 508 the region generally perpendicular to a remainder of the recycled sheet. The bent orientation can be maintained 510 until the heated region cools below its melting point. The cut-off of the recycled sheet can be secured/anchored into a cut-off trench across (transverse) the canal at intervals of 20 to 50 feet along the canal length as specified by the design criteria. The frequency of cut-off placement can be determined by existing conditions that effect uplift and will be the same with longitudinal or transverse welded splices. To summarize, the cut-off can be accomplished by fabricating a heat formed 90 degree angle using recycled sheets equal to the full canal width (canal bottom plus sloped sides but not extending into the berm). In one implementation one leg of the angle can be approximately 8 inches and the other leg approximately 4 inches.

Figure 6:
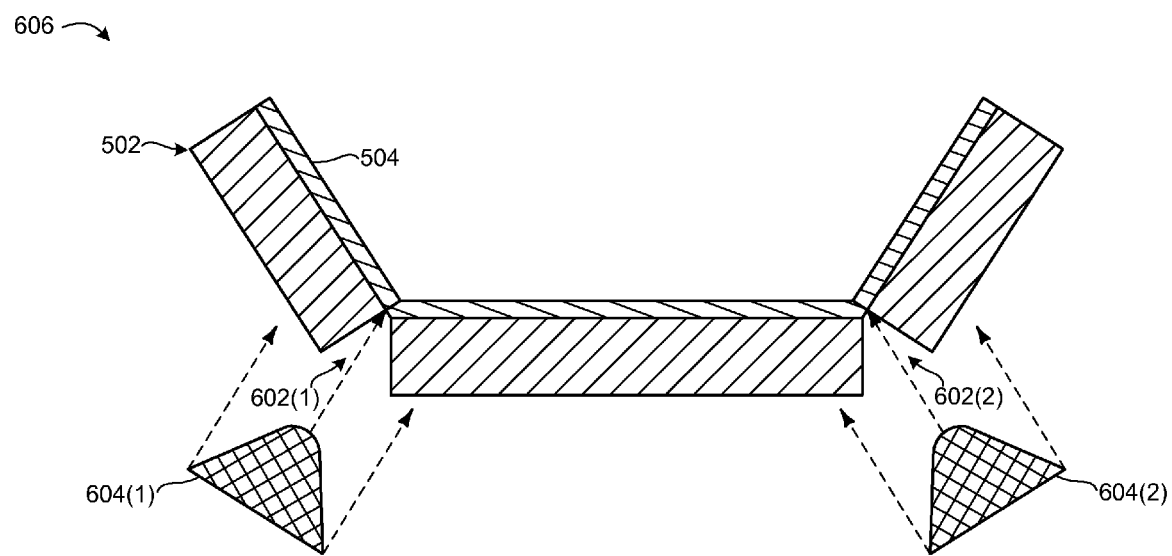

FIG. 6 shows one technique and structure for utilizing the recycled sheet 502 with cut-off 504. With respect to inserting the heat formed recycled sheet cut-off into the full canal width, a relief cut 602(1) and 602(2) can be made at the slope upturn on each side. These cuts can be sealed with a triangle patch (i.e., Gusset) 604(1) and 604(2) using the example adhesive/mastic technique described above relative to FIG. 3 to form a recycled sheet angle with gussets (hereinafter "Cut-Off Sheet") 606.

Figure 7:
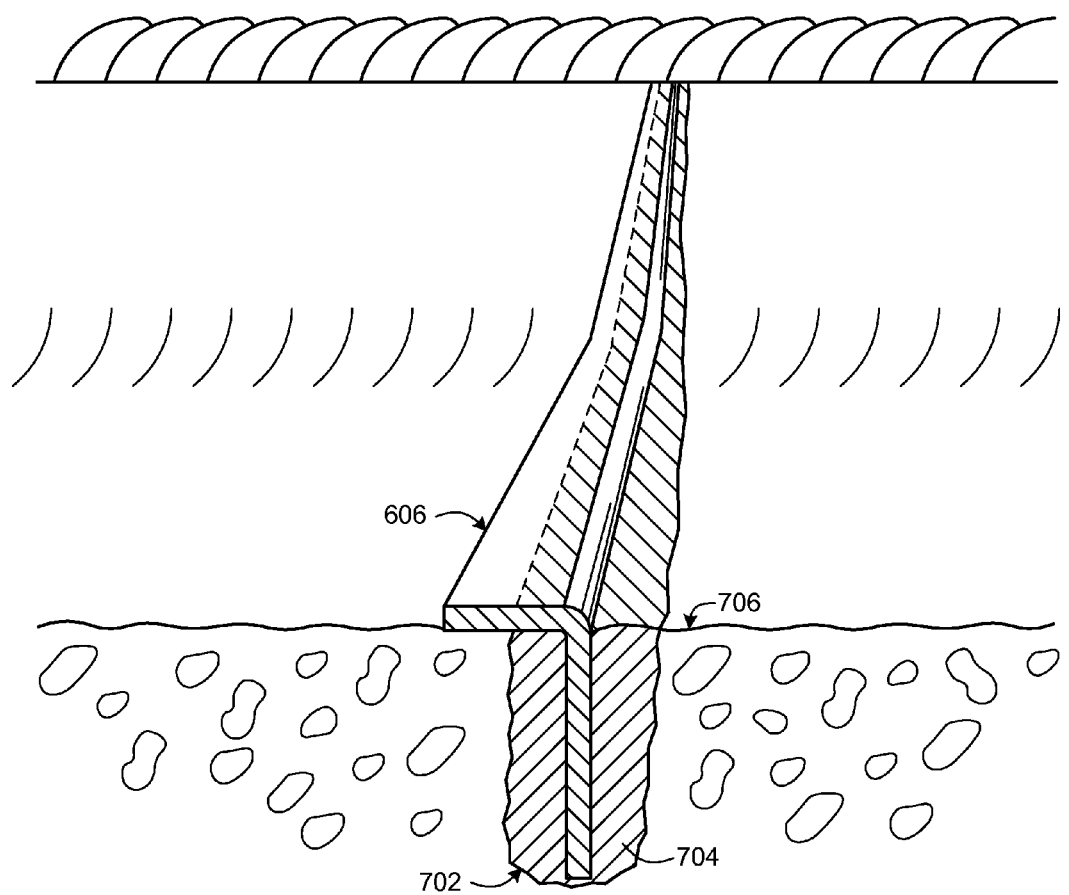

FIG. 7 shows cut-off sheet 606 placed in a trench 702 that has been dug across the canal. Subsequently, soil 704 is replaced and tamped on both sides of the recycled cut-off sheet. Additional substrate, such as crushed rock can be utilized to bring tamped soil back to level with existing soil surface 706.

Figure 8:
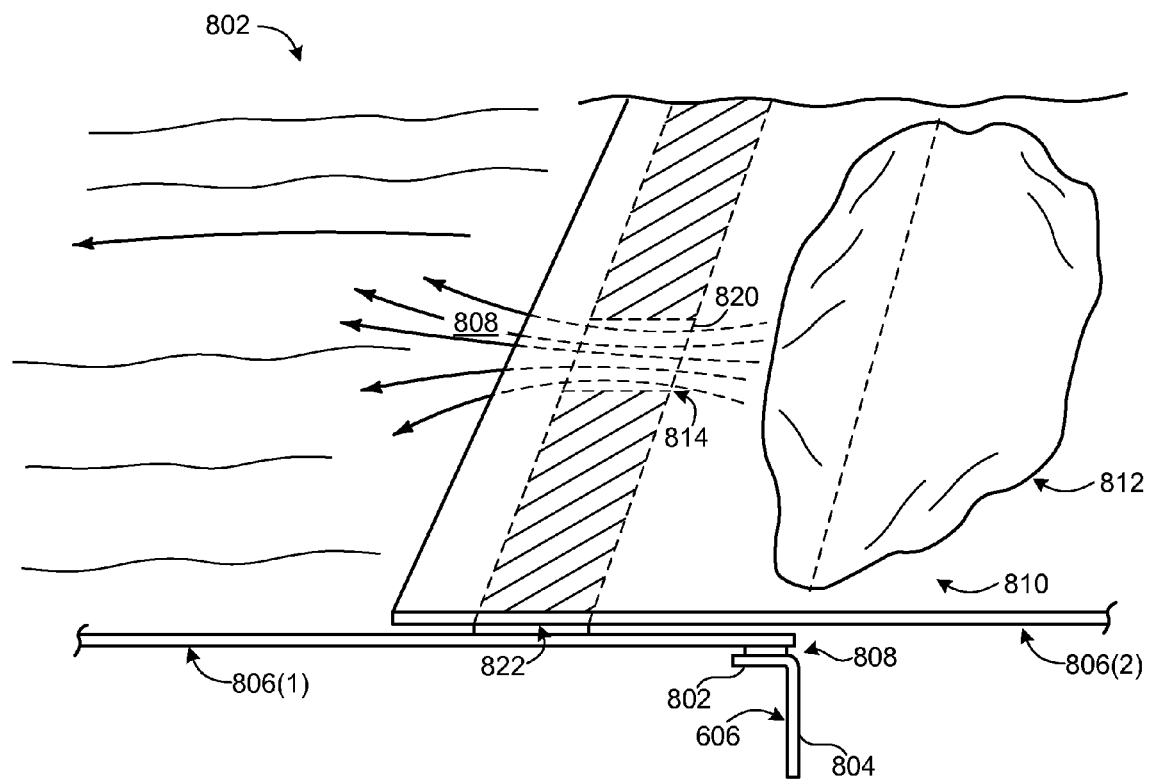

FIG. 8 shows how cut-off sheet 606 can be spliced to overlying recycled sheets to reduce uplift/movement of a fluid liner 800. In this case, cut-off sheet 606 includes a generally vertical member 802 that is dug into the underlying substrate. For instance, a trench can be dug in the underlying substrate for receiving the generally vertical member 802. Upon installation of the generally vertical member the trench can be refilled and compacted to limit water movement. Cut-off sheet 606 also includes a generally horizontal member 804 that can be spliced to recycled sheet 806(1) as indicated at 808. The horizontal member 804 of the cut-off sheet can be spliced to an overlying portion of recycled sheet 806(1) utilizing one or more of the techniques described above, such as the sandwich bonding or thermal welding techniques. Subsequently, upstream recycled sheet 806(2) can be positioned in the canal and spliced to recycled sheet 806(1) as described above.

To summarize, the exposed flap of the cut-off sheet 606 can be spliced to the downstream recycled sheet or section. The cut-off sheet allows tamping on both sides which tends to fix the sheet in place and the formed angle provides a smooth flow of fluid/water as it passes over the cut-off. In addition, the sides of the recycled sections can be embedded into a berm along each side of the canal.

While the discussion above offers great detail about techniques for making water tight fluid liners, some implementations can purposely facilitate strategic water movement through the fluid liner 802. For instance, despite sound fluid liner installation techniques, water may get under the fluid liner and force the fluid liner up and/or away from the substrate of the canal. For instance, during periods of heavy precipitation the local topography may cause surface water to flow into the canal. This surface/ground water can force itself between the substrate and the fluid liner. Some of the present implementations offer solutions that controllably allow this surface/ground water to pass through the fluid liner and join the water within the fluid liner without allowing substantial leakage of canal water in the reverse direction out through the fluid liner.

FIG. 8 offers one example for accomplishing this controlled water flow. As mentioned above, FIG. 8 shows a fluid liner 800 that includes first and second recycled sheets 806(1) and 806(2). The recycled sheets are installed in a manner to facilitate water flow within the canal as indicated by arrow 808. A water flow control structure indicated generally at 810 can allow (and potentially actively force) ground water 812 that is trapped under recycled sheet 806(2) to enter the canal. The water flow control structure can accomplish this water movement without substantial water loss in the reverse direction. In this implementation, water flow control structure 810 includes a water obstruction structure in the form of cut-off sheet 606 and a one way valve 814. Cut-off sheet 606 can be configured to block downstream movement of surface water 812.

Recall that the cut-off sheet's vertical member 804 is dug into the underlying substrate to limit water movement. Cut-off sheet 606 can force the surface/ground water between first and second recycled sheets 806(1) and 806(2). One way valve 814 is formed from one or more unsealed regions within splice(s) 822 joining recycled sheets 806(1) and 806(2). Pressure of surface/ground water forced between the recycled sheets can force one way valve 814 open to allow water flow. The weight of the overlying canal water can cause the surface/ground water to be under significant pressure. Once sufficient surface/ground water flows through one way valve 814, the one way valve can close as the pressure diminishes.

The above described implementations offer techniques for utilizing recycled sheets to create effective fluid liners. Previous fluid liner technologies did not recognize the exemplary techniques described herein that allow recycled sheets to be spliced to create fluid liners. Further, the properties of the recycled sheets are leveraged to offer more performant fluid liner solutions than previously available.

The invention claimed is:

1. An apparatus, comprising:
a first recycled geosynthetic sheet arranged in an irrigation canal, the first recycled geosynthetic sheet having an upward facing side and a downward facing side;
a second recycled geosynthetic sheet arranged upstream of the first recycled geosynthetic sheet in the irrigation canal, the apparatus including a first overlapping portion with a heat welded splice between the upward facing side of the first recycled geosynthetic sheet and a downward facing side of the second recycled geosynthetic sheet; and,
a third recycled geosynthetic sheet arranged downstream of the first recycled geosynthetic sheet in the irrigation canal, the apparatus including a second overlapping portion with another heat welded splice between the downward facing side of the first recycled geosynthetic sheet and an upward facing side of the third recycled geosynthetic sheet,
wherein the heat welded splice and the another heat welded splice function as fluid seals.

2. The apparatus of claim 1, wherein the apparatus is configured to prevent seepage of water that is flowing through the irrigation canal.

* * * * *